(12) United States Patent
Pachidis et al.

(10) Patent No.: US 11,407,507 B2
(45) Date of Patent: Aug. 9, 2022

(54) LIFT ROTOR SYSTEM

(71) Applicant: ROLLS-ROYCE plc, London (GB)

(72) Inventors: Vasileios Pachidis, Milton Keynes (GB); Chana A Saias, Bedford (GB)

(73) Assignee: ROLLS-ROYCE plc, London (GB)

( * ) Notice: Subject to any disclaimer, the term of this patent is extended or adjusted under 35 U.S.C. 154(b) by 160 days.

(21) Appl. No.: 16/930,008

(22) Filed: Jul. 15, 2020

(65) Prior Publication Data
US 2021/0031909 A1 Feb. 4, 2021

(30) Foreign Application Priority Data

Jul. 30, 2019 (GR) .............................. 20190100324
Sep. 23, 2019 (GB) ................................... 1913668

(51) Int. Cl.
| | | |
|---|---|---|
| B64C 29/00 | (2006.01) | |
| B64C 7/00 | (2006.01) | |
| B64C 9/00 | (2006.01) | |
| B64C 39/06 | (2006.01) | |
| B64C 11/28 | (2006.01) | |
| B64C 39/12 | (2006.01) | |

(52) U.S. Cl.
CPC ............ *B64C 29/0025* (2013.01); *B64C 7/00* (2013.01); *B64C 9/00* (2013.01); *B64C 11/28* (2013.01); *B64C 39/068* (2013.01); *B64C 39/12* (2013.01); *B64C 2009/005* (2013.01)

(58) Field of Classification Search
CPC ... B64C 29/0025; B64C 11/28; B64C 39/068; B64C 9/02; B64C 27/24
See application file for complete search history.

(56) References Cited

U.S. PATENT DOCUMENTS

| 4,789,115 A | 12/1988 | Koutsoupidis |
| 6,622,962 B1 | 9/2003 | White |
| | (Continued) | |

FOREIGN PATENT DOCUMENTS

| EP | 3418186 A1 | 12/2018 |
| WO | 2015/200345 A1 | 12/2015 |
| WO | 2016134366 A1 | 8/2016 |

OTHER PUBLICATIONS

Dec. 23, 2020 Search Report issued in European Patent Application No. 20187367.6.

(Continued)

*Primary Examiner* — Richard R. Green
*Assistant Examiner* — Ashesh Dangol
(74) *Attorney, Agent, or Firm* — Oliff PLC (57) ABSTRACT

A lift rotor arrangement (100) for a VTOL aircraft (200). The lift rotor arrangement (100) comprises: a fairing (6) mounted on a wing segment (10); and first and second rotor blades (17, 18) mounted on a first shaft (4) extending vertically from the fairing (6). The first shaft (4) is movable between an extended position in which the first and second rotor blades (17, 18) are vertically spaced above the wing segment (10) and are rotatable to provide vertical lift, and a retracted position in which the first and second rotor blades (17, 18) are rotationally-fixed with the first rotor blade (17) stowed within the wing segment (10). The blades (17, 18) may be rotatable around an axis substantially perpendicular to the axis of the respective first shaft (4) so as to act as ailerons/elevons in the retracted position.

14 Claims, 7 Drawing Sheets

(56) References Cited

U.S. PATENT DOCUMENTS

| | | |
|---|---|---|
| 8,376,264 B1 | 2/2013 | Hong et al. |
| 2010/0108801 A1 | 5/2010 | Olm et al. |
| 2015/0028151 A1 | 1/2015 | Bevirt et al. |
| 2016/0207625 A1* | 7/2016 | Judas ................... B64C 3/38 |
| 2017/0183088 A1* | 6/2017 | Du ..................... B64C 27/08 |
| 2018/0362154 A1* | 12/2018 | Louis ................ B64C 27/30 |
| 2019/0092462 A1 | 3/2019 | Foskey |
| 2020/0269980 A1* | 8/2020 | Fink ................. B64C 39/068 |

OTHER PUBLICATIONS

Feb. 26, 2020 Search Report issued in Great Britain Patent Application No. GB1913668.8.

\* cited by examiner

LIFT ROTOR SYSTEM

CROSS-REFERENCE TO RELATED APPLICATIONS

This specification is based upon and claims the benefit of priority from Greek Patent Application Number 20190100324 filed on 30 Jul. 2019, and from UK Patent Application Number GB1913668.8 filed on 23 Sep. 2019, the entire contents of which are incorporated herein by reference.

BACKGROUND

Field of the Disclosure

The present disclosure relates to a lift rotor system for a vertical take-off and landing (VTOL) aircraft, and provides an arrangement as set out in the appended claims. It also relates to a wing segment for a VTOL aircraft and a VTOL aircraft having such a lift rotor arrangement and wing segment.

Description of the Related Art

Lift-plus-cruise vertical take-off and landing (VTOL) aircraft can operate in both airplane and helicopter modes. Their configuration is based on utilising separate systems for hover lift and cruise thrust. They carry lift rotors which are active during vertical take-off and landing, and cruise rotors which are active during cruise.

In most of the current VTOL aircraft configurations, the inactive lift rotors can generate significant amounts of drag during cruise and thus compromise the performance of the aircraft with associated penalties in range and/or payload capability.

There is the need to reduce the drag created by the inactive lift rotors during cruise.

Current VTOL lift rotor designs often involve the addition of many extra mechanisms required for both vertical and horizontal propulsion. There is a need to minimise the weight of lift rotor designs suitable for VTOL aircraft.

There is also a need to secure the rotor blades safely during cruise, to ensure maximum lift can be provided by, and to improve the aerodynamic performance of, lift rotor systems used in VTOL aircraft, and reduce the environmental impact of VTOL aircraft.

SUMMARY

According to a first aspect there is provided a lift rotor arrangement for a VTOL aircraft, the lift rotor arrangement comprising: a fairing mounted on a wing segment; and first and second rotor blades mounted on a first shaft extending vertically from the fairing, wherein the first shaft is movable from an extended position in which the first and second rotor blades are vertically spaced above the wing segment and are rotatable to provide vertical lift, and a retracted position in which the first and second rotor blades are rotationally-fixed with the first rotor blade stowed within the wing segment.

The advantage of such a configuration is that it reduces drag caused by the rotor arrangement on a VTOL aircraft using such a lift rotor arrangement during the VTOL aircraft's cruise phase.

Another advantage of such a configuration is that it provides an improved means for locking the rotors into a safe position during cruise.

In the extended position the rotor blades are clear of the wing segment and can rotate to provide vertical lift to the VTOL aircraft. In the retracted position, the VTOL aircraft is driven forward by a cruise thrust system and the retraction of the shaft and rotor blades towards the wing segment with the first rotor blade stowed within the wing segment reduces drag during cruise.

In some embodiments, in the retracted position, the first rotor blade is stowed within a recess provided in a surface (e.g. an upper surface) of the wing segment e.g. so that the first rotor blade is flush with the upper surface of the wing segment.

Such a configuration provides a combination of safe containment of the rotor blade, whilst allowing the opposite surface of the wing (e.g. the lower surface, when the rotor blade recess is provided in the upper surface) to be specifically shaped for optimum aerodynamic performance.

In yet further embodiments, in the retracted position, the first rotor blade is stowed within a void provided in the wing segment so as to form a portion of the wing segment e.g. with the first rotor blade flush with the upper surface and the opposing lower surface of the wing segment.

The use of such voids within the wing allows for further weight savings as less material is used in the wings, and allows the downdraft created by the rotors to affect a greater area when a VTOL using such a lift rotor arrangement is deployed in helicopter mode.

In some embodiments, the lift rotor arrangement further comprises third and fourth rotor blades mounted on a second shaft extending vertically from the fairing in an opposing vertical direction to the first shaft, wherein the second shaft is movable between an extended position in which the third and fourth rotor blades are vertically spaced below the wing segment and are rotatable in an opposing direction to the first and second blades, and a retracted position in which the third and fourth rotor blades are rotationally-fixed with the third rotor blade stowed within a surface of the wing segment.

Such a contra-rotating rotor arrangement can cancel out torque within the single wing system, and can be more efficient than a single propeller system.

In some embodiments, in the retracted position, the third rotor blade is stowed within a recess provided in a surface (e.g. a lower surface) of the wing segment (opposite to the surface within which the first rotor is stowed) e.g. so that the third rotor blade is flush with the lower surface of the wing segment. Such an arrangement provides similar advantages to stowing the first rotor blade in an upper recess within the wing segment.

In some embodiments, the wing segment is a box-wing segment having upper and lower wing portions and the fairing is provided at the joint between the upper and lower wing portions. The upper wing portion may be a forward-swept portion and the lower wing portion may be a swept-back portion or vice versa. The upper surface of the wing segment may be provided on the upper wing portion and the lower surface of the wing segment may be provided on the lower wing portion.

Box wing designs can provide extra stiffness to the structure of a VTOL aircraft using such a lift rotor arrangement and reduce aerodynamic losses at the wing tips.

In yet further embodiments, in the retracted position, the first rotor blade is stowed within a void provided in the upper wing portion so as to form an integral part of the upper wing portion e.g. with the first rotor blade flush with an upper surface and a lower surface of the upper wing portion and/or the third rotor blade is stowed within a void provided in the lower wing portion so as to form an integral part of the lower wing portion e.g. with the third rotor blade flush with an upper surface and a lower surface of the lower wing portion. Such a design allows further weight savings as less material is used within the wing portions.

In some embodiments, the rotor blades are aerofoils with a leading edge and a trailing edge. In the retracted position, the trailing edge of the first rotor blade may be aligned with a rearward edge of the wing segment (i.e. rearward in the direction of forward cruise motion). The leading edge of the first rotor blade may be aligned with a forward edge of the void or recess in the wing segment. Thus the first rotor blade may have a width and length that substantially match the width (between the forward and rearward edges) and length of the void or recess in the wing segment. Such an arrangement minimises the creation of turbulent flow or additional drag over the top of the wing as a result of the rotor being stowed within a void or recess within the wing segment.

In the retracted position, the trailing edge of the third rotor blade may be aligned with a rearward edge of the wing segment (i.e. rearward in the direction of forwarding cruise motion). The leading edge of the third rotor blade may be aligned with a forward edge of the void or recess in the wing segment. Thus the third rotor blade may have a width and length that substantially match the width (between the forward and rearward edges) and length of the void or recess in the wing segment. Such an arrangement minimises the creation of turbulent flow or additional drag across the bottom of the wing or at the leading edge of the rotor blade as a result of the rotor being stowed within a void or recess within the wing segment.

In some embodiments, the first and/or third rotor blades have an adjustable/variable pitch i.e. they can be rotated around an axis substantially perpendicular to the axis of the respective shaft.

This provides the advantage of allowing the rotor blades to act as a control surface e.g. to act as an aileron or elevon in the retracted position to provide attitude control during cruise. This in turn may provide the advantages of reducing weight and manufacturing costs as additional attitude control elements may not be required.

In some embodiments, the second and/or fourth rotor blades can also be rotated around the axis substantially perpendicular to the axis of the shaft (together with and in the same direction as or opposite direction to the first and/or third rotor blades) to act as an aileron/elevon in the retracted position and provide the same advantages as previously discussed.

In some embodiments, the rotor blades are simple symmetric aerofoils with a maximum thickness at 50% of the chord. This design provides the advantage that the drag created by the external rotor (which protrudes beyond the faring when the rotor is in the stowed position) travelling through the air in the opposite direction compared to when it is rotating to provide lift is reduced.

In some embodiments, the first and/or second shaft may be provided with further rotor blades in addition to the first and second/third and fourth. Extra blades can increase the amount of lift the rotors can generate, or allow the rotors to rotate more slowly whilst producing the same amount of lift force.

In some embodiments, each shaft retracts and extends electrically between the extended and retracted positions. The lift rotor arrangement may further comprise a motor or a respective motor (e.g. an electric motor) for retracting and extending each shaft between the extended and retracted positions. The motor(s) may be housed within the fairing. Such an arrangement can be used within all-electric or hybrid VTOL aircraft, reducing the environmental impact of a VTOL using such a lift rotor arrangement.

In some embodiments, the fairing is mounted on the tip of the wing segment i.e. at the lateral end of the wing segment remote from an aircraft body. Such an arrangement can provide increased structural rigidity to a VTOL aircraft using such a lift rotor arrangement, and reduce aerodynamic losses at the wing tips.

In some embodiments, the wing segment is a box-wing segment having upper and lower wing portions and the fairing is provided at the joint between the upper and lower wing portions. The upper wing portion may be a forward-swept portion and the lower wing portion may be a swept-back portion or vice versa. The upper surface of the wing segment may be provided on the upper wing portion and the lower surface of the wing segment may be provided on the lower wing portion. Such arrangements can also provide increased structural rigidity to a VTOL aircraft using such a lift rotor arrangement, and reduce aerodynamic losses at the wing tips.

In some embodiments, the faring is aerodynamically optimised i.e. it may have a rounded leading edge and a tapered trailing edge. The fairing may comprise a rudder for yaw control. Such arrangements help meet the need for reduced drag and improved performance handling of a VTOL aircraft using such a lift rotor arrangement.

In a second aspect, there is a VTOL aircraft comprising an aircraft body having at least two rotor lift arrangements according to the first aspect disposed laterally either side of the aircraft body.

In some embodiments, the aircraft body comprises a forward nose portion with two forward rotor lift arrangements disposed laterally either side of the nose portion. In some embodiments, the aircraft body further comprises a rearward tail portion with two rearward rotor lift arrangements disposed laterally either side of the tail portion. Such arrangements can increase the amount of mass the VTOL aircraft can carry, and can improve the handling characteristics and flight stability of the VTOL aircraft.

The wing segment in the two rearward rotor lift arrangements at the tail portion may be a box-wing segment with upper and lower wing portions as described above and the fairings may be provided at the joint between the two box-wing portions. The two rearward rotor lift arrangements may comprise the first shaft with the first and second rotor blades and the opposing second shaft with the third and fourth rotor blades. The two rearward rotor lift arrangements may comprise fairings with respective rudders as described above.

In some embodiments, the two forward lift rotor arrangements at the nose portion may only each comprise the first shaft with the first and second rotor blades. The wing segments in the forward lift rotor arrangements may be simple wing segment or may be a box-wing segment as described above. In other embodiments, the two forward lift rotor arrangements at the nose portion may further comprise the opposing second shaft and third/fourth rotor blades. The fairings in the lift rotor arrangements at the nose portion may be rudderless. Such options allow the VTOL aircraft to be optimised depending on the needs for lift capability, energy consumption, range, flight speed and other factors.

The tail portion may comprise a pusher propeller e.g. a contra-rotating pusher propeller to drive the VTOL aircraft forwards.

The term "arrangement" used herein encompasses assemblies of apparatus, i.e. arrangements of various pieces of moveable and stationary hardware which can be combined to create the advantageous configurations described herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
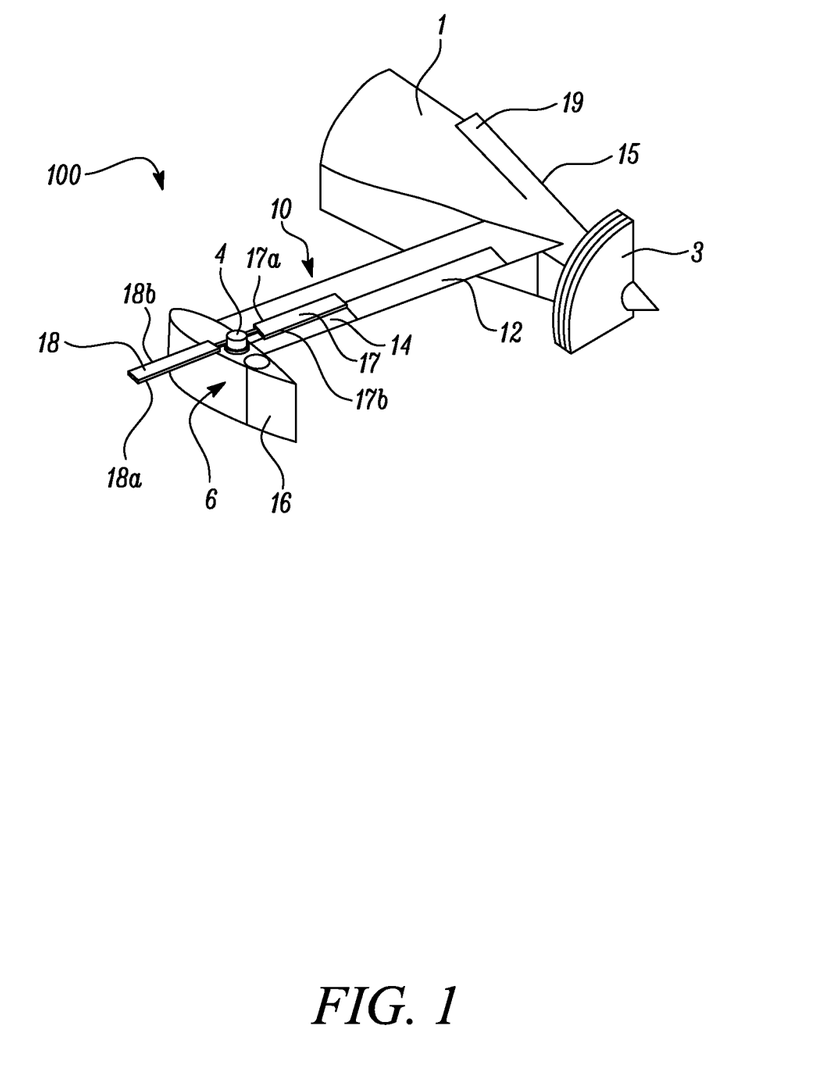
FIG. 1 shows a first embodiment of a rotor lift arrangement in the extended position.

FIG. 1 shows a first embodiment of a lift rotor arrangement 100 for a VTOL aircraft in the extended position.

The lift rotor arrangement 100 comprises an aerodynamic fairing 6 mounted on the tip of a wing segment 10. The fairing 6 comprises a rearward rudder portion 16. The lift rotor arrangement also includes a first rotor blade 17 and second rotor blade 18 mounted on a first shaft 4 extending vertically from the fairing 6.

In the extended position when vertical thrust is required for vertical take-off, the first shaft 4 is vertically extended away from the fairing 6 by an electric motor (not shown) housed within the fairing 6. In this extended position, the first and second blades 17, 18 are spaced away from the wing segment 10 and are free to rotate with the first shaft 4 about a vertical axis in order to create the vertical thrust. The vertical spacing of the first and second blades means they rotate in a plane which is spaced from the wing segment enabling them to rotate freely without risk of colliding with any components of the wing segment 10 or fairing 6.

An air intake 19 is mounted on top of a body/fuselage 1 to provide an air flow to the main power plant of the aircraft, which may be a hybrid, turbo-electric or fully electric power plant.

Figure 2:
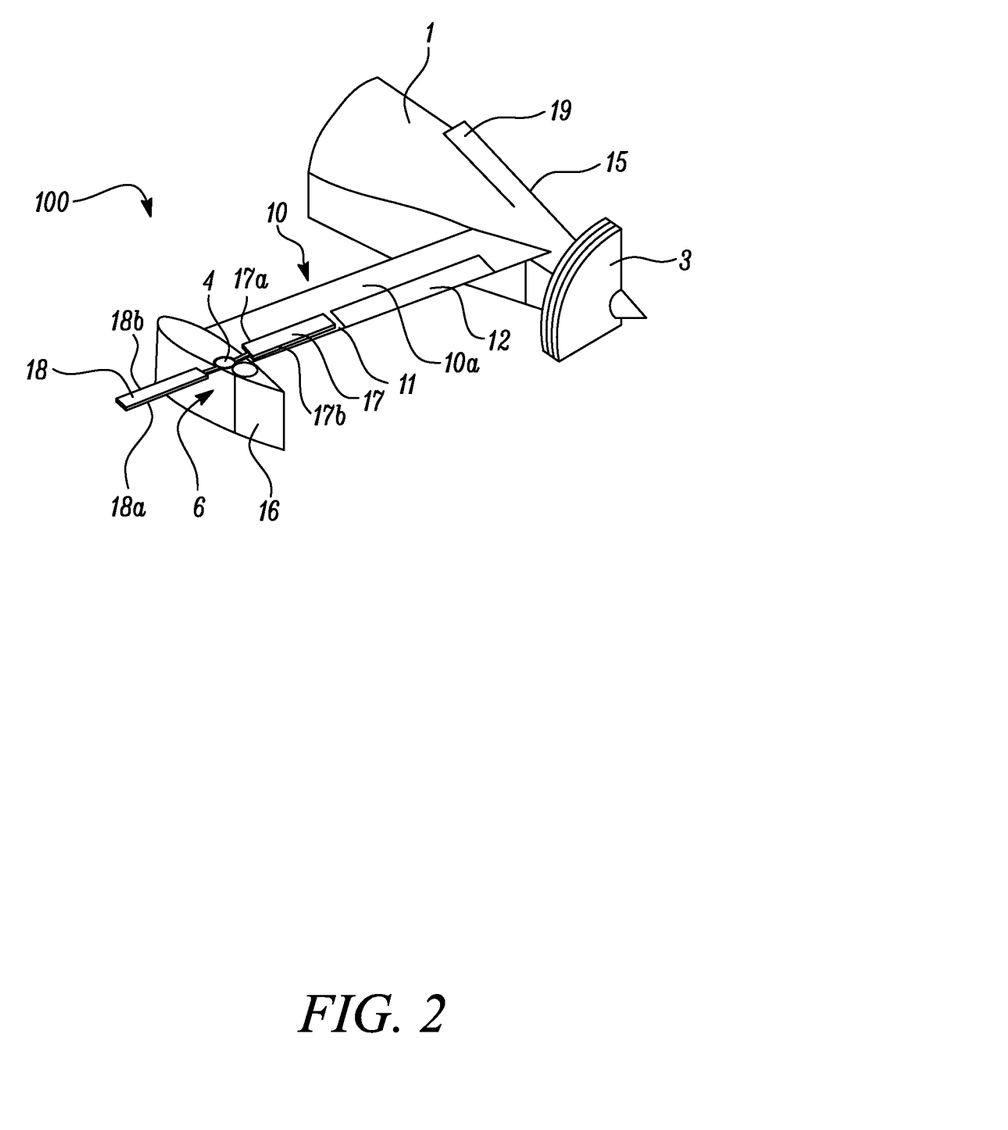
FIG. 2 shows the first embodiment of a rotor lift arrangement in the retracted position.

FIG. 2 shows the lift rotor arrangement 100 in the retracted position where the first shaft 4 is retracted into the fairing 6. The rotor blades 17, 18 are rotationally-fixed relative to the vertical axis of the shaft with the first rotor blade 17 stowed within a recess 14 (see FIG. 1) provided in the wing segment 10. The first rotor is flush with an upper surface 10a of the wing segment 10 in order to reduce drag during forward cruise driven by a pusher propeller 3.

The first and second rotor blades 17, 18 are aerofoils and each have a respective leading edge 17a, 18a and trailing edge 17b, 18b. In the retracted position, the trailing edge 17b of the first rotor blade is aligned with the rearward edge 11 of the wing segment 10.

The first and second rotor blades 17, 18 have an adjustable/variable pitch i.e. they can be rotated around an axis substantially perpendicular to the axis of the first shaft 4. This allows the first and second rotor blades 17, 18 to act as a control surface e.g. as an aileron or elevon in the retracted position to provide attitude control during cruise.

The wing segment may additionally comprise flaps/elevons 12 to assist in pitch and roll control.

Figure 3:
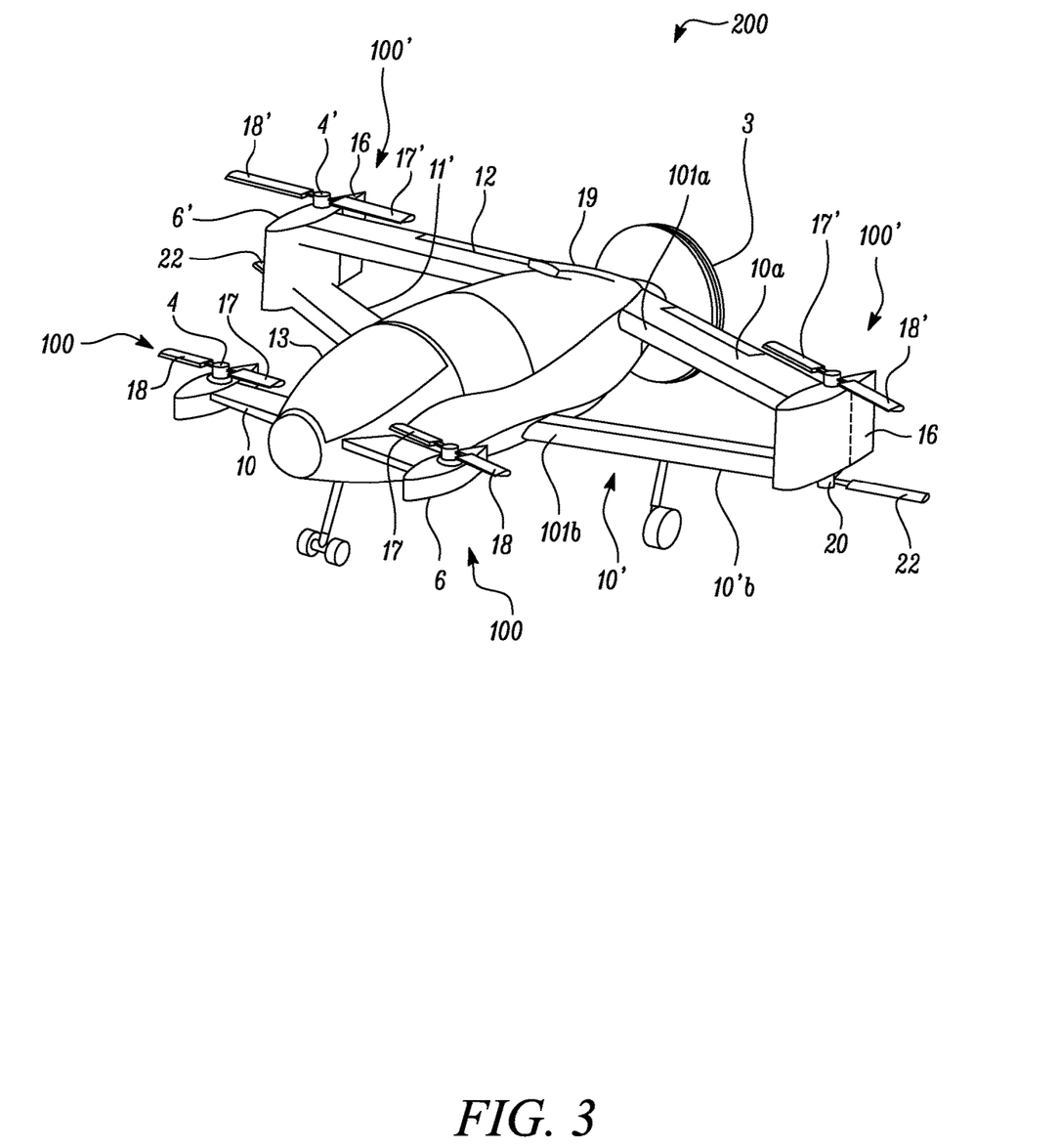
FIG. 3 shows a perspective view of a VTOL aircraft comprising a plurality of rotor lift arrangements in an extended position.
Figure 4:
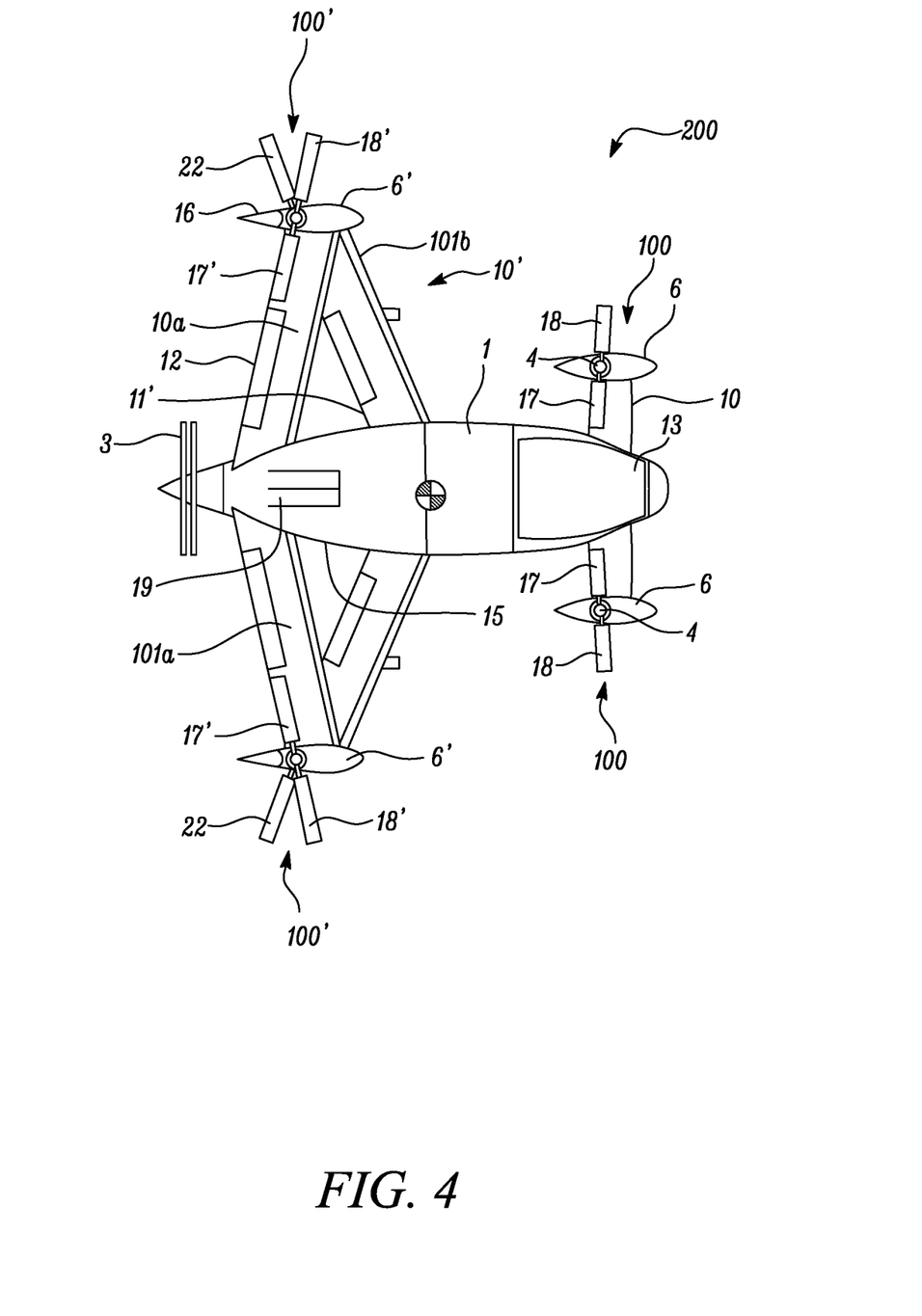
FIG. 4 shows a top view of the VTOL aircraft of FIG. 3 with the lift rotor arrangements in a retracted position.

FIG. 3 shows a VTOL aircraft 200 including the rotor lift arrangements 100 in the extended position. FIG. 4 shows the VTOL aircraft 200 including the rotor lift arrangements 100 in the retracted position.

The aircraft comprises an aircraft body/fuselage 1 with a nose portion 13 and a tail portion 15.

The nose portion 13 is provided with two forward lift rotor arrangements 100 substantially as described above in relation to FIGS. 1 and 2 except that the fairing 6 is rudderless.

The tail portion 15 is provided with two rearward lift rotor arrangements 100' each comprising a fairing 6' with an extendable and retractable first shaft 4' with first and second rotor blades 17', 18' as described above in FIGS. 1 and 2.

The wing segments 10' in the rearward rotor lift arrangements 100' are box-wing segments having an upper wing portion 101a and a lower wing portion 101b, and the fairings 6' are provided at the joints between the upper and lower wing portions 101a, 101b. The upper wing portions 101a are a forward-swept portion and the lower wing portions 101b are swept-back portions.

In the retracted position, each first blade 17' is flush with an upper surface 10a of the upper wing portion 101a.

Figure 5:
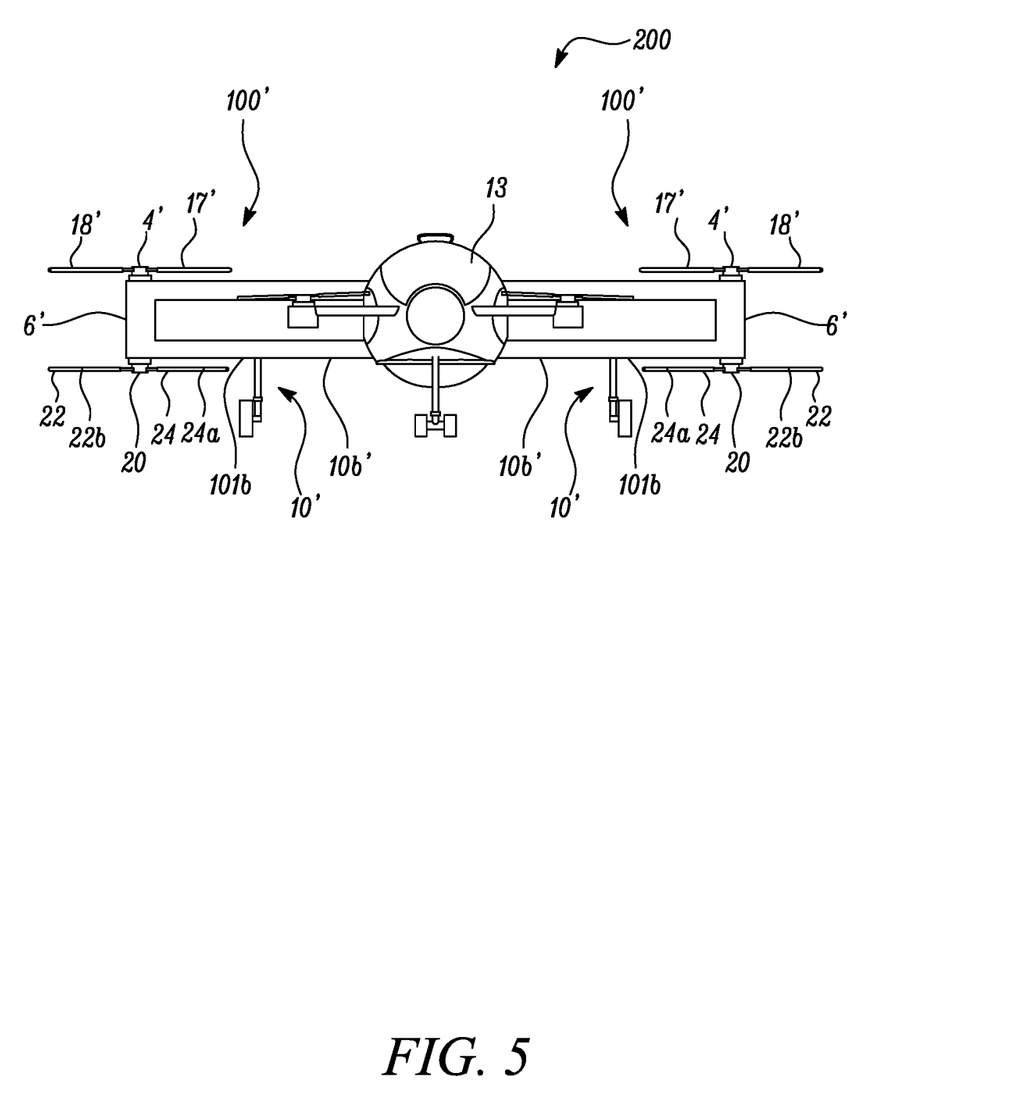
FIG. 5 shows an end-on view of the VTOL aircraft of FIG. 3.

FIG. 5 shows an end-on view of the VTOL aircraft 200. The fairings 6' on the rearward lift rotor arrangements 100' each further comprise a second shaft 20 with third blades 24 and fourth blades 22 mounted thereon. The third blades 24 have a leading edge 24a and a trailing edge (not shown), the leading edge being at the front of the blade in the direction of rotation of the third blade 24, and the trailing edge being at the back of the blade in the direction of rotation. The fourth blades 22 have a leading edge (not shown) and a trailing edge (22b), the leading edge being at the front of the blade in the direction of rotation of the fourth blade 22, and the trailing edge 22b being at the back of the blade in the direction of rotation. The second shaft 20 is electrically extendable from and retractable within the fairing 6' in an opposing vertical direction to the first shaft 4'. In the extended position, the third 24 and fourth blades 22 are spaced away from the wing segment 10' to rotate with the second shaft 20 (in a direction opposite to the rotation of the first and second blades 17', 18') to provide vertical lift. The vertical spacing of the third 24 and fourth 22 blades means they rotate in a plane which is spaced from the wing segment enabling them to rotate freely without risk of colliding with any components of the wing segment 10' or fairing 6'.

In the retracted position, the third blade 24 is stowed within the lower wing portion 101b of the box wing segment 10', flush with a lower surface 10'b of the lower wing portion 101b.

Similar to the first blade 17' and as discussed above in relation to the FIGS. 1 and 2, the third blade 24 is an aerofoil and, in the retracted position, the trailing edge of the third rotor blade 24 is stowed in alignment with a rearward edge 11' of the lower wing portion 101b.

Figure 6:
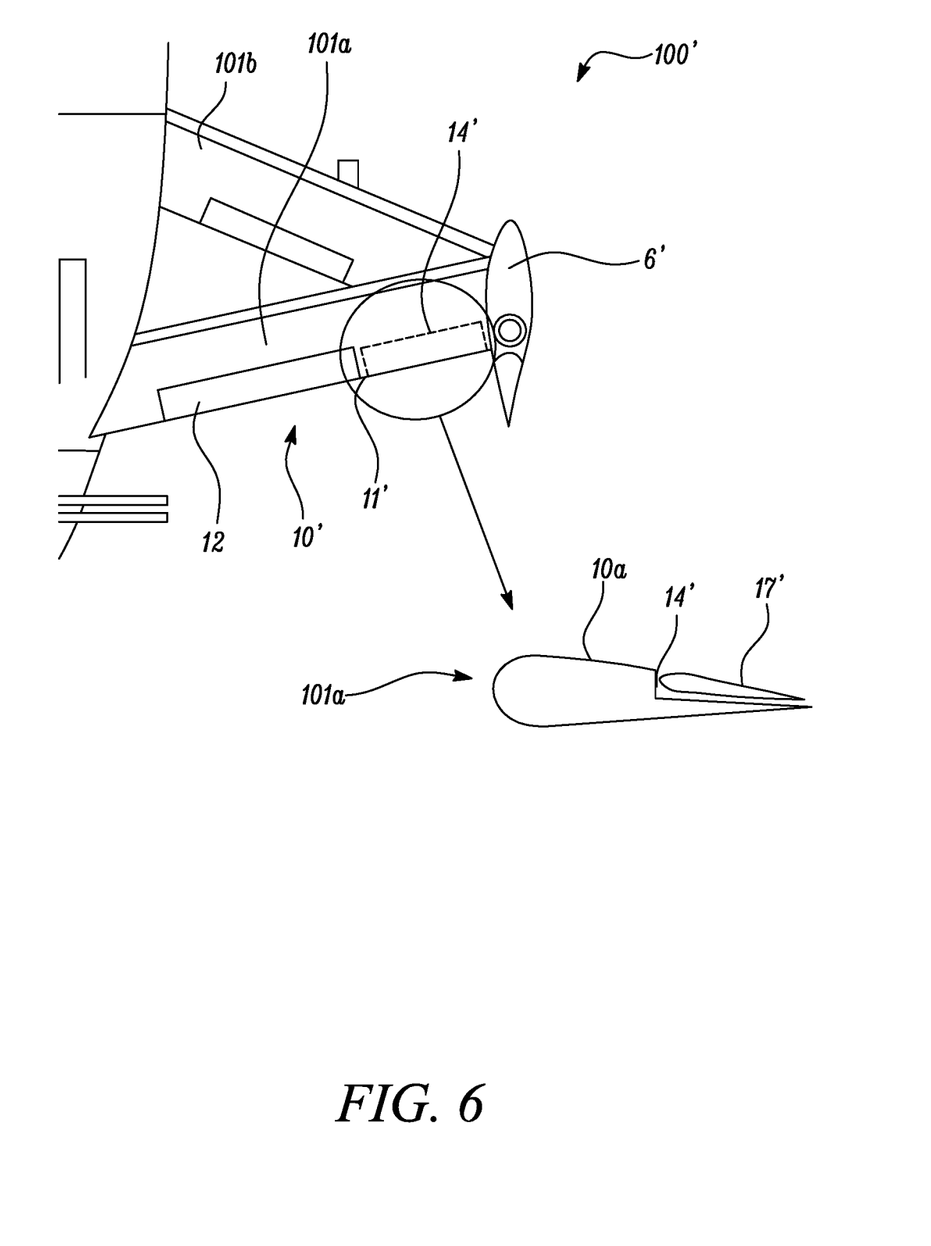
FIG. 6 shows a partial top view of the VTOL aircraft of FIG. 4.

FIG. 6 shows a partial top view of the VTOL aircraft 200 with just the rearward lift rotor arrangements 100' (and no blades) shown. The insert shows the recess 14' in the upper wing portion 101a of the wing segment 10' with the first blade 17' nested within the recess 14' so as to be flush with the upper surface 10a of the wing segment 10'/upper wing portion 101a.

Figure 7:
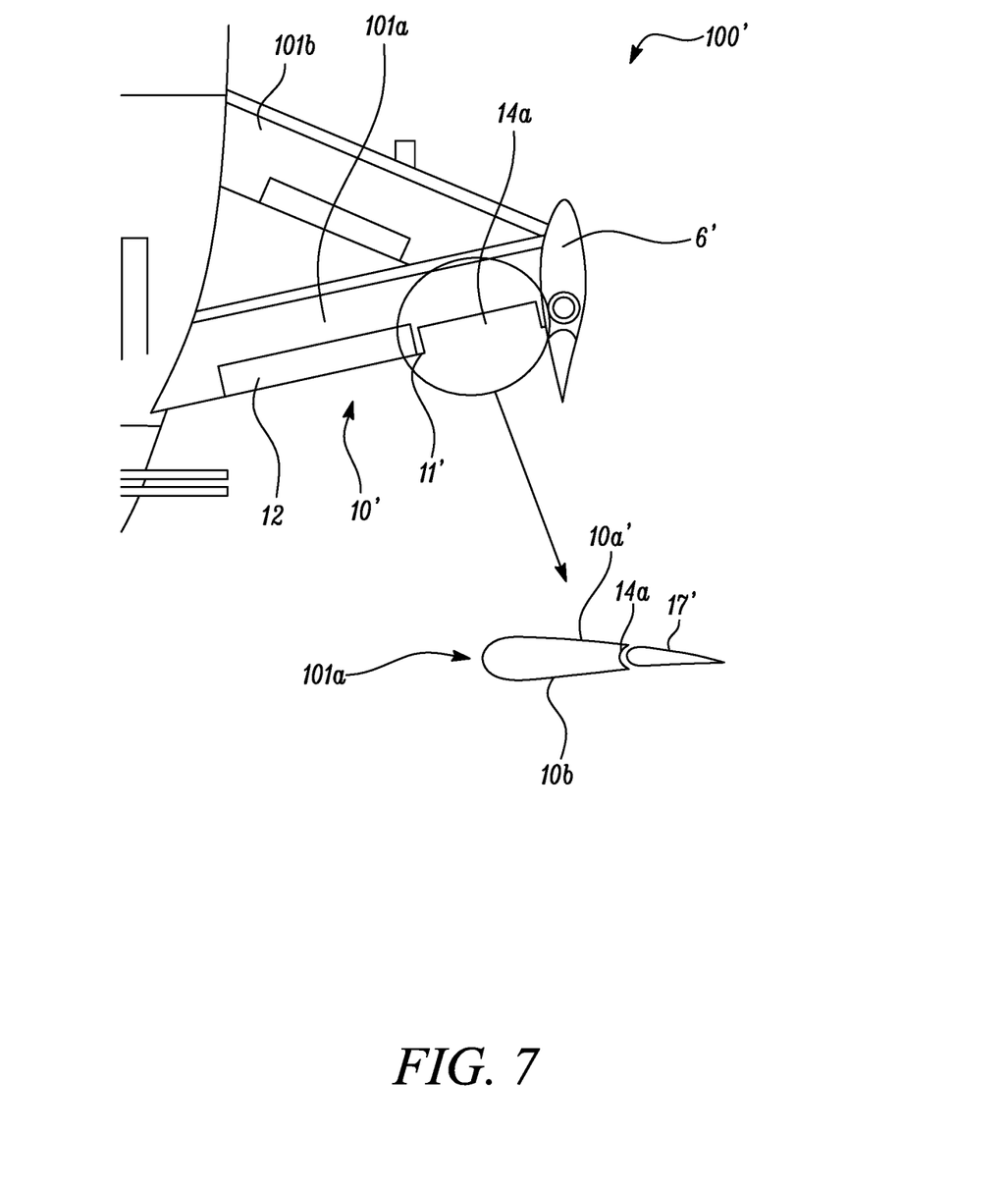
FIG. 7 shows a partial top view of an alternative embodiment of a VTOL aircraft.

FIG. 7 shows a partial top view of an alternative embodiment, where the upper wing segment 101a comprises a void 14a. The insert shows the void 14a in the upper wing portion 101a of the wing segment 10' with the first blade 17' nested within the recess void 14a to form a portion of the upper wing portion 101a flush with the upper surface 10a' of the wing segment 10'/upper wing portion 101a and a lower surface 10b of the upper wing portion 101a. Similar arrangements are possible with the lower wing portion 101b, so that the third blade 24 can be retracted to sit either within a recess or within a void of the lower wing portion.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A lift rotor arrangement for a VTOL aircraft, the lift rotor arrangement comprising:
    a fairing mounted on a wing segment; and
    first and second rotor blades mounted on a first shaft extending vertically from the fairing, wherein
    the first shaft is movable between an extended position in which the first and second rotor blades are vertically spaced above the wing segment and are rotatable to provide vertical lift, and a retracted position in which the first and second rotor blades are rotationally-fixed with the first rotor blade stowed within the wing segment, and
    the first and second rotor blades are aerofoils with a respective leading edge and trailing edge and the trailing edge of the first rotor blade forms or is a continuation of a rearward edge of the wing segment in the retracted position.

2. The lift rotor arrangement according to claim 1 wherein, in the retracted position, the first rotor blade is stowed within a recess or a void in the wing segment.

3. The lift rotor arrangement according to claim 1 further comprising third and fourth rotor blades mounted on a second shaft extending vertically from the fairing in an opposing vertical direction to the first shaft, wherein the second shaft is movable between an extended position in which the third and fourth rotor blades are vertically spaced below the wing segment and are rotatable in an opposing direction to the first and second blades rotor blades, and a retracted position in which the third and fourth rotor blades are rotationally-fixed with the third rotor blade stowed within the wing segment.

4. The lift rotor arrangement according to claim 3 wherein, in the retracted position, the third rotor blade is stowed within a recess or a void in the wing segment.

5. The lift rotor arrangement according to claim 1 wherein the wing segment is a box-wing having upper and lower wing portions and the fairing is provided at the join between the upper and lower wing portions.

6. The lift rotor arrangement according to claim 3 wherein, in the retracted position, the first blade is stowed within the upper wing portion and the third rotor blade is stowed within the lower wing portion.

7. The lift rotor arrangement according to claim 3 wherein the third and fourth rotor blades are aerofoils with a respective leading edge and trailing edge and wherein the trailing edge of the third rotor blade is aligned with a rearward edge of the wing segment in the retracted position.

8. The lift rotor arrangement of claim 1 wherein at least the first rotor blade is rotatable around an axis substantially perpendicular to the axis of the first shaft so as to act as ailerons/elevons in the retracted position.

9. The lift rotor arrangement according to claim 3 wherein the third rotor blade is rotatable around an axis substantially perpendicular to the axis of the respective second shaft so as to act as ailerons/elevons in the retracted position.

10. A VTOL aircraft having an aircraft body having at least two rotor lift arrangements according to claim 1 disposed laterally either side of the aircraft body.

11. The VTOL aircraft of claim 10 wherein the aircraft body comprises a forward nose portion with two forward rotor lift arrangements disposed laterally either side of the nose portion.

12. The VTOL aircraft of claim 10 wherein the aircraft body comprises a rearward tail portion with two rearward rotor lift arrangements disposed laterally either side of the tail portion.

13. The VTOL aircraft of claim 12 wherein the two rearward rotor lift arrangements have a box-wing segment with upper and lower wing portions and the fairings are provided at the join between the two wing portions.

14. The VTOL aircraft according to claim 12 wherein the two rearward rotor lift arrangements comprise a first shaft with first and second blades and a second shaft with third and fourth blades.

* * * * *